United States Patent
Davis et al.

(10) Patent No.: US 6,725,216 B2
(45) Date of Patent: Apr. 20, 2004

(54) PARTITIONING SEARCH KEY THEREBY DISTRIBUTING TABLE ACROSS MULTIPLE NON-CONTIGUOUS MEMORY SEGMENTS, MEMORY BANKS OR MEMORY MODULES

(75) Inventors: Gordon Taylor Davis, Chapel Hill, NC (US); Clark Debs Jeffries, Durham, NC (US)

(73) Assignee: International Businesss Machines Corporation, Armonk, NY (US)

( * ) Notice: Subject to any disclaimer, the term of this patent is extended or adjusted under 35 U.S.C. 154(b) by 431 days.

(21) Appl. No.: 09/928,200

(22) Filed: Aug. 10, 2001

(65) Prior Publication Data

US 2003/0033307 A1 Feb. 13, 2003

(51) Int. Cl.⁷ .............................................. G06F 17/30
(52) U.S. Cl. ................................................ 707/3; 707/4
(58) Field of Search ............................... 707/3, 4, 2, 10, 707/100, 102; 370/254, 408; 380/264, 286; 709/223, 236; 710/22; 711/108, 148

(56) References Cited

U.S. PATENT DOCUMENTS

| | | | |
|---|---|---|---|
| 5,060,143 A | 10/1991 | Lee ................................ 707/6 |
| 5,551,027 A | 8/1996 | Choy et al. .................... 53/127 |
| 5,664,223 A | * 9/1997 | Bender et al. ................. 710/22 |
| 5,710,915 A | 1/1998 | McElhiney ..................... 707/3 |
| 5,873,074 A | 2/1999 | Kashyap et al. ............... 707/2 |
| 5,960,194 A | 9/1999 | Choy et al. .................. 707/102 |
| 5,978,793 A | 11/1999 | Kashyap et al. .............. 707/2 |
| 6,223,172 B1 | * 4/2001 | Hunter et al. ................. 707/3 |
| 6,343,289 B1 | * 1/2002 | Hunter et al. ................. 707/10 |
| 6,430,527 B1 | * 8/2002 | Waters et al. ................. 703/3 |
| 6,434,662 B1 | * 8/2002 | Greene et al. .............. 711/108 |
| 6,522,632 B1 | * 2/2003 | Waters et al. ............... 370/254 |
| 6,611,832 B1 | * 8/2003 | van Lunteren ................. 707/3 |

FOREIGN PATENT DOCUMENTS

| EP | 0651339 A2 | 5/1995 |
| JP | 8255168 A | 10/1996 |
| JP | 11096190 A | 4/1999 |

* cited by examiner

*Primary Examiner*—Diane D. Mizrahl
*Assistant Examiner*—Apu Mofiz
(74) *Attorney, Agent, or Firm*—Winstead Sechrest & Minick PC

(57) ABSTRACT

A system and method for retrieving information in a distributed table by partitioning a search key. A packet processor may generate a search key for a received packet of data. The packet processor may partition the search key into a plurality of segments where the length of each segment corresponds to a size of a particular layer of a table. The packet processor may read a particular entry in a particular layer, e.g., the first layer, of the table using a value of the segment, e.g., the first segment, associated with that layer. A determination may be made to determine if the particular entry read stores a pointer that points to the next level of the table. If so, then the packet processor may read a particular entry in the next level of the table using the value of the next segment of the plurality of segments.

37 Claims, 4 Drawing Sheets

FIG. 3

|   |   |   |   |
|---|---|---|---|
| 1 | 2 | 3 | 4 |
| 5 | 6 | 7 | 8 |
| 9 | 10 | 11 | 12 |
| 13 | 14 | 15 | 16 |

301  $W_0 = 4$

|   |   |   |   |
|---|---|---|---|
| 1 | 2 | 3 | 4 |
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |

302  $W_1 = 5$

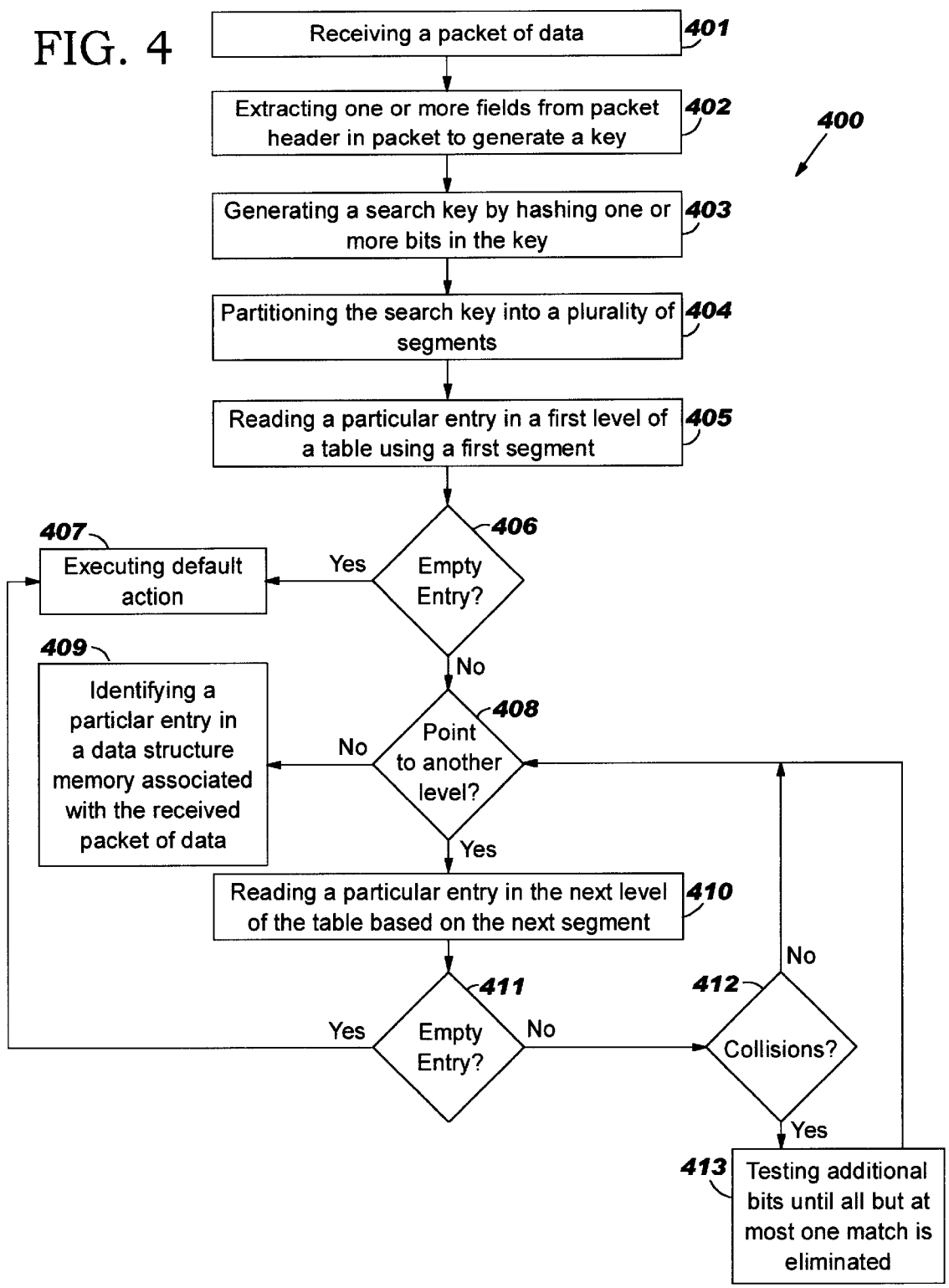

PARTITIONING SEARCH KEY THEREBY DISTRIBUTING TABLE ACROSS MULTIPLE NON-CONTIGUOUS MEMORY SEGMENTS, MEMORY BANKS OR MEMORY MODULES

TECHNICAL FIELD

The present invention relates to the field of a packet switching network, and more particularly to partitioning a search key thereby distributing a table, e.g., direct table, across multiple non-contiguous segments within a memory bank, multiple banks of memory or memory modules.

BACKGROUND INFORMATION

A packet switching network has switching points or nodes for transmissions of data among senders and receivers connected to the network. The switching performed by these switching points is in fact the action of passing on packets of data received by a switching point or node to a further node in the network. Such switching actions are the means by which communication data is moved through the packet switching network.

Each node may comprise a packet processor configured to process packets of data. When a packet processor receives a particular packet of data, the packet processor may produce what is commonly referred to as a key. The key may be hashed into a smaller size key commonly referred to as a search key. That is, the search key may be two or more bits of the key where the one or more bits may be non-contiguous bits of the key. It is noted that the non-contiguous bits of the key may be selected using various logical operations such as AND, OR and NOT. The search key may be used to determine what actions to perform on the packet as described in further detail below. Typically, a key may be generated by the packet processor by extracting particular information in the packet header, e.g., source and destination address, source and destination port. Once the key is generated, a selected two or more bits of the key may be hashed into a search key used to access an entry into a table commonly referred to as a direct table. The direct table may comprise entries storing pointers that point to particular entries in a data structure memory. The data structure memory may comprise a plurality of entries storing data structures. A data structure may comprise data as to what actions, e.g., modify packet, port to forward packet, the packet processor should perform on the packet.

A search key may be used to access an entry in the direct table by performing what is commonly referred to as a "full match" search. In a full match search, if the search key indexes to an empty entry in the direct table, then a default action, e.g., transmitting packet to a higher layer classification, may be taken. If the search key indexes to an entry in the direct table with exactly one stored pattern, then the full key of the identity of the new packet is masked and compared with the stored item. If there is a match, then the action associated with the stored item may be taken. If there is not a match, a default action may be taken. If the search key indexes to an entry in the direct table corresponding to more than one stored pattern, then additional bits of the key are tested until all but at most one match is eliminated from further consideration. That is, the other bits of the key that were not hashed into the search key may be tested until all but at most one match is eliminated from further consideration. Then the full key of the identity of the new packet is masked and compared with the remaining stored item. If there is a match, then the action associated with the stored item may be taken. If there is not a match, a default action may be taken.

Since a search key may be many bits long, e.g., sixteen, the packet processor may use only certain bits to determine which entry to access in the direct table. Consequently, one or more entries may be accessed in the direct table by the same search key thereby causing a collision. The larger the size of the direct table, i.e., the more entries in the direct table, the less probability of a collision occurring. Hence, it may be desirable to build a single table with a size correlated to the length of the search key, i.e., the number of entries in the single table is equivalent to $2^n$ where n is the number of bits in the search key. However, a direct table that size may not be feasible to build.

It would therefore be desirable to partition a search key into multiple segments thereby distributing a table, e.g., direct table, across multiple non-contiguous segments within a memory bank, multiple banks of memory or memory modules. By distributing a table, e.g., direct table, across multiple non-contiguous segments within a memory bank, multiple banks of memory or memory modules, tables that may not have been feasible to build may be built. Furthermore, by distributing a table, e.g., direct table, across multiple non-contiguous segments within a memory bank, multiple banks of memory or memory modules, search keys may be able to access the distributed table at a faster rate than the table constructed as a single table. The search keys may be able to access the distributed table at a faster rate than the table constructed as a single table since each layer of the distributed table is smaller in size than the table constructed as a single table thereby being able to be stored in faster memory. Furthermore, a table distributed across multiple non-contiguous segments within a memory bank, multiple banks of memory or memory modules, may have the same probability of collisions as the distributed table constructed on a single table of the same size.

SUMMARY

The problems outlined above may at least in part be solved in some embodiments by partitioning a search key into a plurality of segments where each segment length corresponds to a size of a particular level of a table. By partitioning a search key into a plurality of segments, a table may be distributed by storing levels of the table across multiple non-contiguous segments within a memory bank, across multiple banks in a memory or across memory modules.

In one embodiment of the present invention, a method for retrieving information in a distributed table by partitioning a search key may comprise the step of an internal processor within the packet processor receiving a packet of data. The internal processor may extract one or more fields in the packet header of the received packet to generate a key. The internal processor may then hash two or more bits of the key to generate a search key. The search key may then be partitioned into a plurality of segments where the length of each segment corresponds to a size of a particular layer of a table. For example, suppose the internal processor generates a key with a length of thirty-two bits, e.g., 11100110111100110111100110111001101. As stated above, a portion of the key may be hashed into a search key used to index into a particular entry in a table, e.g., direct table. For example, the first nine bits, e.g., 111001101, of the key may be used to index into a particular entry in the table as a search key. The internal processor may then partition the search key into two segments where the first segment has a length of four bits ($W_0$=4), e.g., 1110, and the second segment has a length of five bits ($W_1$=5), e.g., 01101. As stated above, the size of each layer of the table may be correlated to the length of each segment of the search key. For example, the size of the first layer ($2^4$) may be correlated to the length of the first segment ($W_0=4$) and the size of the second layer ($2^5$) may be correlated to the length of the second search key ($W_1=5$). The internal processor may be configured to read a particular entry in a layer, e.g., first layer, of the table using the value of the segment associated with the layer, e.g., first segment with a value of 1110.

A determination may be made by the internal processor to determine if the particular entry read was empty. If the particular entry read was empty then the internal processor may execute a default action. If the particular entry read was not empty then a determination may be made by the internal processor to determine if the particular entry read by the internal processor stores a pointer that points to the next level of the table. If the particular entry points to the next level of the table, the internal processor may read a particular entry in the next level of the table using the value of the next segment of the plurality of segments, e.g., second segment with a value of 01101.

A determination may be made by the internal processor to determine if the particular entry read in the next level of the table was empty. If the particular entry read in the next level of the table was empty then the internal processor may execute a default action. If the particular entry read was not empty then a determination may be made by the internal processor to determine if the particular entry read in the next level of the table by the internal processor has two or more patterns. If there are two or more patterns in the particular entry read, then additional bits are tested until all but one pattern of the two or more patterns are eliminated. Upon identifying a single pattern, the internal processor may determine if the particular entry read stores a pointer that points to the next level of the table. If the particular entry read has only one pattern, then the internal processor may determine if the particular entry read stores a pointer that points to the next level of the table. If the particular entry does not point to the next level of the table, then the internal processor may use the information in the particular entry read to identify a particular entry in a data structure memory. The particular entry read may be a pointer which points to a particular entry in the data structure memory storing a data structure associated with the received packet of data. The data structure may comprise data as to what actions, e.g., modify packet, forward the packet to a particular port, the internal processor is to perform on the received packet of data.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 3 illustrates multiple segments of a search key accessing multiple layers of a table in accordance with the present invention;

FIG. 4 is a flowchart of a method for retrieving information in a distributed table by partitioning a search key.

DETAILED DESCRIPTION

Figure 1:
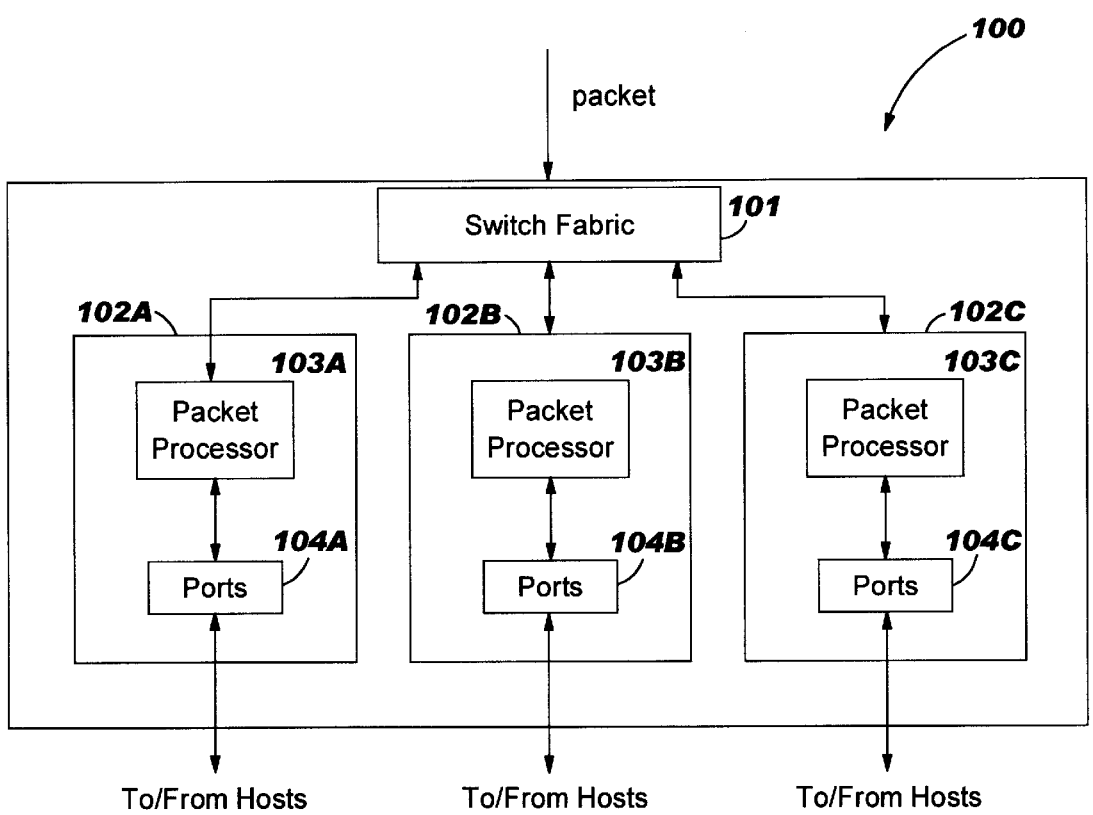
FIG. 1 illustrates an embodiment of a switch in a packet switching network configured in accordance with the present invention.

FIG. 1—Switch in a Packet Switching Network

FIG. 1 illustrates an embodiment of a switch 100 in a packet switching network. Switch 100 may be configured to receive packets of data that may be directed to another particular switch 100 in the packet switching network. Switch 100 may comprise a switch fabric 101 configured to direct the incoming packets of data to particular modules 102A–C coupled to switch fabric 101. Modules 102A–C may be configured to process packets of data received by switch 100. Module 102A may comprise a packet processor 103A coupled with ports 104A. Modules 102B and 102C are configured similarly to module 102A. Modules 102A–C may collectively or individually be referred to as modules 102 or module 102, respectively. Packet processors 103A–C may collectively or individually be referred to as packet processors 103 or packet processor 103, respectively. Ports 104 may collectively or individually be referred to as ports 104 or port 104, respectively. Each port 104 may be coupled with hosts (not shown). Modules 102 may provide traffic to switch fabric 101 and accept traffic from switch fabric 101. Thus, any host connected with one of modules 102 may communicate with another host connected to another module 102. It is noted that switch 100 may comprise any number of modules 102 and each module 102 may comprise any number of packet processors 103 and ports 104 and that FIG. 1 is illustrative.

Figure 2:
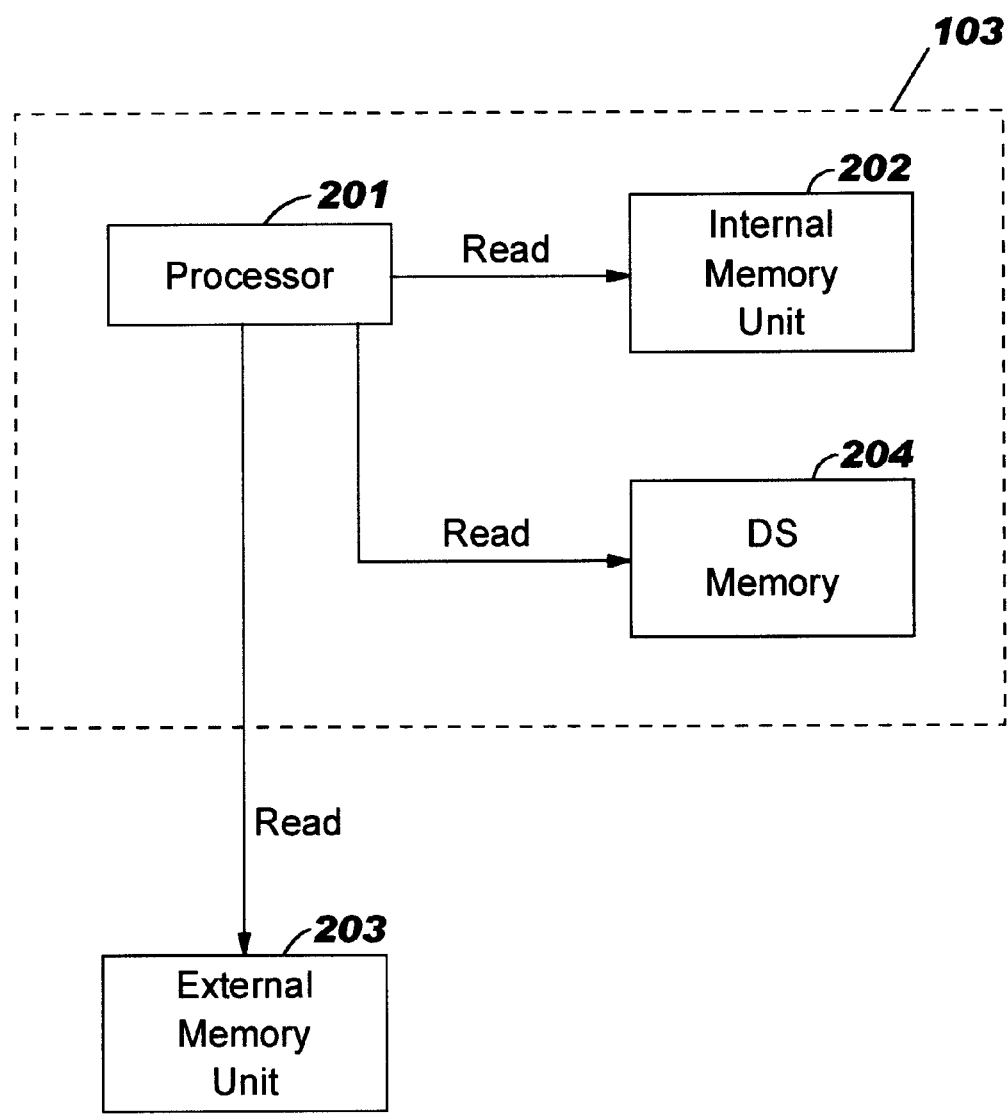
FIG. 2 illustrates an embodiment of a packet processor configured in accordance with the present invention.

FIG. 2—Packet Processor

FIG. 2 illustrates an embodiment of the present invention of a packet processor 103 in a packet switching network. Packet processor 103 may be configured to receive packets, i.e., frames, of data from switch fabric 101 (FIG. 1) and transmit the packets, i.e., frames, of data to another switch 100 in the packet switching network. Packet processor 103 may comprise an internal processor 201 configured to receive a packet of data from switch fabric 101 (FIG. 1) and extract one or more fields, e.g., source and destination address, source and destination port, from the packet header in the packet to generate a key. Internal processor 201 may then be configured to hash two or more bits of the key into a search key used to index an entry into a table, e.g., direct table. A description of a hash algorithm used to hash two or more bits of the key into a search key is described in U.S. patent application Ser. No. 09/210,222, filed on Dec. 10, 1998, entitled "Hash Function in IP, MAC, and Other Structured Addresses," Attorney Docket No. RAL919980056US1, which is hereby incorporated herein in its entirety by reference.

Packet processor 103 may further comprise an internal memory unit 202, e.g., Static Random Access Memory (SRAM), storing one or more levels of a table, e.g., direct table, as described in detail further below. One or more other levels of the table, e.g., direct table, may be stored in an external memory source such as external memory unit 203, e.g., Dynamic RAM (DRAM), SRAM, as described in detail further below. External memory unit 203 may reside in any location external to packet processor 103 such as in module 102 or external to module 102 within switch 100. It is noted that internal memory unit 202 and external memory unit 203 may be any size memory. In one embodiment, internal memory unit 202 is a faster, more expensive memory than external memory unit 203. It is further noted that a table, e.g., direct table, may be distributed in levels distributed across multiple noncontiguous segments within a memory bank in a particular memory unit, e.g., memory unit 202, across multiple banks of memory in a particular memory unit, e.g., memory unit 202, or across memory units, e.g., memory units 202 and 203. The table, e.g., direct table, may comprise entries storing pointers used to point to particular entries in a data structure memory 204. Data structure memory 204 may comprise a plurality of data structures where each data structure may comprise specific actions, e.g., modify packet, forward the packet to a particular port, that processor 201 should perform on the received packet. It is noted that packet processor 103 may have more than one internal memory unit 202 and more than one memory unit external to packet processor 103, e.g., memory unit 203, and that FIG. 2 is illustrative.

As stated in the Background Information section, a search key may be used to access an entry in a table, e.g., direct table. Since a search key may be many bits long, e.g., sixteen, the packet processor may use only certain bits to determine which entry to access in the direct table. Consequently, one or more entries may be accessed in the direct table by the same search key thereby causing a collision. The larger the size of the direct table, i.e., the more entries in the direct table, the less probability of a collision occurring. Hence, it may be desirable to build a single table with a size correlated to the length of the search key, i.e., the number of entries in the single table is equivalent to $2^n$ where n is the number of bits in the search key. However, a direct table that size may not be feasible to build. It would therefore be desirable to partition a search key into multiple segments thereby distributing a table, e.g., direct table, across multiple non-contiguous segments within a memory bank, multiple banks of memory or memory modules. By distributing a table, e.g., direct table, across multiple non-contiguous segments within a memory bank, multiple banks of memory or memory modules, tables that may not have been feasible to build may be built. Furthermore, by distributing a table, e.g., direct table, across multiple non-contiguous segments within a memory bank, multiple banks of memory or memory modules, search keys may be able to access the distributed table at a faster rate than the table constructed as a single table. The search keys may be able to access the distributed table at a faster rate than the table constructed as a single table since each layer of the distributed table is smaller in size than the table constructed as a single table thereby being able to be stored in faster memory. Furthermore, a table distributed across multiple non-contiguous segments within a memory bank, multiple banks of memory or memory modules, may have the same probability of collisions as the distributed table constructed on a single table of the same size.

As stated above, processor 201 may be configured to generate a key. For example, suppose processor 201 generated a key with a length of thirty-two bits, e.g., 11100110111100110111100110111001101. As stated above, one or more bits of the key may be hashed into a search key used to index into a particular entry in a table, e.g., direct table. For example, the first nine bits, e.g., 111001101, of the key may be used to index into a particular entry in the table as a search key. It is noted that the search key may be one or more bits of the key where the one or more bits are non-contiguous bits of the key. Processor 201 may further be configured to partition the search key into plurality of segments. Referring to the above example, since the search key has a length of nine bits, a single table with a length (W) equivalent to the length of the search key (W=9) would have the size of $2^9$ (512) entries. However, as stated above, it may be desirable to distribute the single table across multiple noncontiguous segments within a memory bank, multiple banks of memory or memory modules. Subsequently, processor 201 may partition the nine bit search key into two segments where the first segment has a length of four bits ($W_0$=4), e.g., 1110, and the second segment has a length of five bits ($W_1$=5), e.g., 01101. The size of each layer of the table may be correlated to the length of each segment of the search key. For example, the size of the first layer ($2^4$) may be correlated to the length of the first segment of the search key ($W_0$=4) and the size of the second layer ($2^5$) may be correlated to the length of the second search key ($W_1$=5). The sizes of each layer of the table, e.g., $2^{W_0}, 2^{W_1}$, may together equal the size of the distributed table constructed as a single table ($2^W$) where $W=W_0+W_1$. It is noted that processor 201 may partition the search key into any number of segments and that the above is illustrative. It is further noted that each segment may be any length of contiguous or non-contiguous bits in the search key generated by processor 201 provided those bits are not used by other segments. For example, the first segment may be assigned the bits 1101 instead of 1110 and the second segment may be assigned the bits 11100 instead of 01101 from the search key 111001101. It is further noted that the first segment may have a length correlated to a maximum storage size for a particular level of a table that may be stored in a fast internal storage unit within packet processor 103 such as internal memory unit 202.

Processor 201 may be configured to read a particular entry in a first level of the table, e.g., direct table, stored in a memory unit, e.g., internal memory unit 202, using the first segment of the search key. For example, referring to FIG. 3, the first level 301 of a table, e.g., direct table, may comprise sixteen entries if the first segment has a length ($W_0$) of four bits, e.g., 1110. If the first segment has a value of 1110, then processor 201 may read the entry corresponding to the value of the first segment. Since the binary value of 1110 corresponds to the numeric value of 14, processor 201 may read the entry indexed by the numeric value of 14 as illustrated in FIG. 3.

Processor 201 may then determine if the particular entry read stores a pointer that points to the next level of the table stored in a memory unit, e.g., external memory unit 203. If the particular entry read by processor 201 is an empty entry, then a default action may be taken. If the particular entry read by processor 201 is a pointer that points to the next level of the table, then processor 201 may read a particular entry in the next level of the table using the next segment of the search key. For example, referring to FIG. 3, the next level, e.g., second level 302, may comprise thirty-two entries if the second segment has a length ($W_1$) of five bits, e.g., 01101. If the second segment has a value of 01101, then processor 201 may read the entry corresponding to the value of the second segment. Since the binary value of 01101 corresponds to the numeric value of 13, processor 201 may read the entry indexed by the numeric value of 13 of the second level 302 of the table, e.g., direct table. It is noted that each level of the table may be stored in any storage media, e.g., internal memory unit 202, external memory unit 203, thereby distributing the table across multiple non-contiguous segments within a particular memory bank in a particular storage media, across multiple banks in a particular storage media or across multiple storage medias.

If the particular entry read by processor 201 is an empty entry, then a default action may be taken. If the particular entry read by processor 201 has two or more patterns, then additional bits of the key are tested until all but one pattern of the two or more patterns are eliminated. That is, the other bits of the key that were not hashed into the search key may be tested until all but at most one match is eliminated from further consideration. Once a match is identified, processor 201 may determine if the particular entry read by processor 201 stores a pointer that points to the next level of the table. If the particular entry read by processor 201 does not store a pointer that points to the next level of the table, then processor 201 may identify a particular entry in data structure memory 204 associated with the received packet of data. If the particular entry read by processor 201 stores a pointer that points to the next level of the table, then processor 201 may read a particular entry in the next level of the table using the next segment of the search key. Furthermore, if the particular entry read by processor 201 stores one pattern, then processor 201 may determine if the particular entry read by processor 201 stores a pointer that points to the next level of the table. If the particular entry read by processor 201 stores a pointer that points to the next level of the table, then processor 201 may read a particular entry in the next level of the table using the next segment of the search key. If the particular entry read by processor 201 does not store a pointer that points to the next level of the table, then processor 201 may identify a particular entry in data structure memory 204 associated with the received packet of data. Processor 201 may identify a particular entry in data structure memory 204 associated with the received packet of data by using the information in the particular entry read by processor 201. The information read may be a pointer that points to a particular entry in data structure memory 204 storing the data structure associated with the received packet of data. As stated above, the data structure may comprise data as to what actions, e.g., modify packet, forward the packet to a particular port, processor 201 is to perform on the received packet of data.

FIG. 4—Flowchart of a Method for Retrieving Information in a Distributed Table by Partitioning a Search Key FIG. 4 is a flowchart of one embodiment of the present invention of a method 400 for retrieving information in a distributed table by partitioning a search key into a plurality of segments.

Referring to FIG. 4, in step 401, packet processor 103 (FIG. 1) may be configured to receive a packet of data from switch fabric 101 (FIG. 1). Referring to FIGS. 2 and 4, in step 402, processor 201 may be configured to extract one or more fields, e.g., source and destination address, source and destination port, protocol, in the packet header field of the received packet to generate a key. In step 403, processor 201 may be configured to generate a search key by hashing two or more bits of the key. As stated above, a search key may be used to determine what actions to perform on the packet, e.g., modify packet, forward the packet to a particular port, processor 201 should perform on the packet.

In step 404, the search key generated in step 403 may be partitioned into a plurality of segments. Using the example as illustrated above, processor 201 may partition a nine bit search key, e.g., 111001101, into two segments where the first segment has a length of four bits ($W_0=4$), e.g., 1110, and the second segment has a length of five bits ($W_1=5$), e.g., 01101. The size of each layer of the table may be correlated to the length of each segment of the search key. For example, the size of the first layer ($2^{W_0}$) may be correlated to the length of the first segment of the search key ($W_0=4$) and the size of the second layer ($2^{W_1}$) may be correlated to the length of the second search key ($W_1=5$). The sizes of each layer of the table, e.g., $2^{W_0}$, $2^{W_1}$, may together equal the size of the distributed table constructed as a single table ($2^W$) where $W=W_0+W_1$. It is noted that processor 201 may partition the search key into any number of segments and that the above is illustrative. It is further noted that each segment may be any length of contiguous or non-contiguous bits in the search key generated by processor 201 provided those bits are not used by other segments. For example, the first segment may be assigned the bits 1101 instead of 1110 and the second segment may be assigned the bits 11100 instead of 01101 from the search key 111001101. It is further noted that the first segment may have a length correlated to a maximum storage size for a particular level of a table that may be stored in a fast internal storage unit within packet processor 103 such as internal memory unit 202.

In step 405, processor 201 may be configured to read a particular entry in a first level of the table, e.g., direct table, using the first segment of the search key. For example, referring to FIG. 3, the first level 301 of the table may comprise sixteen entries if the first segment has a length of four bits ($W_0=4$), e.g., 1110. If the first segment has a value of 1110, then processor 201 may read the entry corresponding to the value of the first segment. Since the binary value of 1110 corresponds to the numeric value of 14, processor 201 may read the entry indexed by the numeric value of 14 as illustrated in FIG. 3.

In step 406, a determination may be made to determine if the particular entry read by processor 201 is an empty entry. If the particular entry read by processor 201 is an empty entry then a default action may be executed by processor 201 in step 407. If the particular entry read by processor 201 is not an empty entry then a determination may be made to determine if the particular entry read by processor 201 stores a pointer that points to the next level of the table in step 408. If the particular entry stores a pointer that points to the next level of the table, then processor 201 may read a particular entry in the next level of the table using the next segment of the search key in step 410. For example, referring to FIG. 3, the next level, e.g., second level 302, may comprise thirty-two entries if the second segment has a length of five bits ($W_1=5$), e.g., 01101. If the second segment has a value of 01101, then processor 201 may read the entry corresponding to the value of the second segment. Since the binary value of 01101 corresponds to the numeric value of 13, processor 201 may read the entry indexed by the numeric value of 13 of the second level 302 of the table, e.g., direct table.

Upon reading the particular entry indexed by the value of the next segment, processor 201 may be configured to determine if the particular entry read is an empty entry. If the particular entry read by processor 201 is empty then processor 201 executes the default action in step 407. If the particular entry read by processor 201 is not empty then a determination may be made to determine if the particular entry read by processor 201 has two or more patterns in step 412. If there are two or more patterns in the particular entry read, then additional bits in the key are tested until all but one pattern of the two or more patterns are eliminated in step 413. That is, the other bits of the key that were not hashed into the search key may be tested until all but at most one match is eliminated from consideration. Upon identifying a match, processor 201 may determine if the particular entry read by processor 201 stores a pointer that points to the next level of the table in step 408. It is noted that each of the next level(s) of the table may be stored in any storage media, e.g., internal memory unit 202, external memory unit 203, thereby distributing the table across multiple non-contiguous segments within a particular memory bank in a particular storage media, across multiple banks in a storage media or across multiple storage medias.

Referring to step 412, if the particular entry read by processor 201 has one pattern, then processor 201 may determine if the particular entry read by processor 201 stores a pointer that points to the next level of the table in step 408.

Referring to step 408, if the particular entry read by processor 201 does not store a pointer that points to the next level of the table, then processor 201 may identify a particular entry in data structure memory 204 associated with the received packet of data in step 407. Processor 201 may identify a particular entry in data structure memory 204 associated with the received packet of data by using the information in the particular entry read by processor 201. The information read may be a pointer into a particular entry in data structure memory 204 storing the data structure associated with the received packet of data. As stated above, the data structure may comprise data as to what actions, e.g., modify packet, forward the packet to a particular port, processor 201 is to perform on the received packet of data.

It is noted that method 400 may be executed in a different order presented and that the order presented in the discussion of FIG. 4 is illustrative. It is further noted that certain steps may be executed almost concurrently.

Although the system and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for retrieving information in a table by partitioning a search key comprising the steps of:
   receiving a packet of data;
   extracting one or more fields from a packet header of said packet of data to generate a key;
   generating a search key by hashing two or more bits of said key;
   partitioning said search key into a plurality of segments; and
   reading a first particular entry in a first level of said table using a first segment of said plurality of segments of said search key.

2. The method as recited in claim 1 further comprising the step of:
   determining whether said first entry in said first level of said table is empty.

3. The method as recited in claim 2, wherein if said first entry in said first level of said table is empty then the method further comprises the step of:
   executing a default action.

4. The method as recited in claim 2, wherein if said first entry in said first level of said table is not empty then the method further comprises the step of:
   determining if information in said first particular entry in said first level of said distributed table comprises a first pointer to a second level of said table.

5. The method as recited in claim 4, wherein if said information in said first particular entry in said first level of said table comprises said first pointer to said second level of said table then the method further comprises the step of:
   reading a second particular entry in said second level of said table using a second segment of said plurality of segments of said search key.

6. The method as recited in claim 5 further comprising the step of:
   determining if said second particular entry in said second level of said table is empty.

7. The method as recited in claim 6, wherein if said second particular entry in said second level of said table is empty then the method further comprises the step of:
   executing a default action.

8. The method as recited in claim 6, wherein if said second particular entry in said second level of said table is not empty then the method further comprises the step of:
   determining if said second particular entry in said second level of said table stores two or more patterns.

9. The method as recited in claim 8, wherein if said second particular entry in said second level of said table stores two or more patterns then the method further comprises the step of:
   testing additional bits of said key until all but one pattern of said two or more patterns are eliminated.

10. The method as recited in claim 9 further comprising the step of:
    determining if information in said second particular entry in said second level of said table comprises a second pointer to a third level of said distributed table.

11. The method as recited in claim 10, wherein if said information in said second particular entry in said second level of said table does not comprise said second pointer to said third level of said table then the method further comprises the step of:
    identifying a particular entry in a data structure memory associated with said received packet of data using said information in said second particular entry in said second level of said table.

12. The method as recited in claim 11, wherein said particular entry in said data structure memory comprises data as to what actions are to be performed on the received packet of data.

13. The method as recited in claim 10, wherein if said information in said second particular entry in said second level of said table does not comprise said second pointer to said third level of said table then the method further comprises the step of:
    identifying a particular entry in a data structure memory associated with said received packet of data using said information in said second particular entry in said second level of said table.

14. The method as recited in claim 13, wherein said particular entry in said data structure memory comprises data as to what actions are to be performed on the received packet of data.

15. The method as recited in claim 8, wherein if said second particular entry in said second level of said table stores one pattern then the method further comprises the step of:
    determining if information in said second particular entry in said second level of said table comprises a second pointer to a third level of said distributed table.

16. The method as recited in claim 4, wherein if said information in said first particular entry in said first level of said distributed table does not comprise said first pointer to said second level of said table then the method further comprises the step of:
    identifying a particular entry in a data structure memory associated with said received packet of data using said information in said first particular entry in said first level of said table.

17. The method as recited in claim 16, wherein said particular entry in said data structure memory comprises data as to what actions are to be performed on the received packet of data.

18. A switch in a network system, comprising:

a switch fabric;

one or more modules coupled to said switch fabric, wherein said one or more modules are configured to process one or more packets of data received from said switch fabric, wherein each of said one or modules comprises a packet processor, wherein said packet processor comprises:

an internal processor; and an internal memory unit coupled to said internal processor, wherein said internal memory unit is configured to store one or more levels of a table;

wherein said internal processor comprises circuitry for:

receiving a packet of data;

extracting one or more fields from a packet header of said packet of data to generate a key;

generating a search key by hashing two or more bits of said key;

partitioning said search key into a plurality of segments; and reading a first particular entry in a first level of said table using a first segment of said plurality of segments of said search key, wherein said first level of said table is stored in said internal memory unit.

19. The system as recited in claim 18, wherein said internal processor further comprises circuitry for:

determining whether said first entry in said first level of said table is empty.

20. The system as recited in claim 19, wherein if said first entry in said first level of said table is empty then said internal processor further comprises circuitry for:

executing a default action.

21. The system as recited in claim 19, wherein if said first entry in said first level of said table is not empty then said internal processor further comprises circuitry for:

determining if information in said first particular entry in said first level of said table comprises a first pointer to a second level of said table.

22. The system as recited in claim 21, wherein if said information in said first particular entry in said first level of said table comprises said first pointer to said second level of said table then said internal processor further comprises circuitry for:

reading a second particular entry in said second level of said table using a second segment of said plurality of segments of said search key.

23. The system as recited in claim 22, wherein said internal processor further comprises circuitry for:

determining if said second particular entry in said second level of said table is empty.

24. The system as recited in claim 3, wherein if said second particular entry in said second level of said table is empty then said internal processor further circuitry for:

executing a default action.

25. The system as recited in claim 23, wherein if said second particular entry in said second level of said table is not empty then said internal processor further comprises circuitry for:

determining if said second particular entry in said second level of said table stores two or more patterns.

26. The system as recited in claim 25, wherein if said second particular entry in said second level of said table stores two or more patterns then said internal processor further circuitry for:

testing additional bits of said key until all but one pattern of said two or more patterns are eliminated.

27. The system as recited in claim 26, wherein said internal processor further circuitry for:

determining if information in said second particular entry in said second level of said table comprises a second pointer to a third level of said distributed table.

28. The system as recited in claim 27, wherein if said information in said second particular entry in said second level of said table does not comprise said second pointer to said third level of said table then said internal processor further comprises circuitry for:

identifying a particular entry in a data structure memory associated with said received packet of data using said information in said second particular entry in said second level of said table.

29. The system as recited in claim 28, wherein said particular entry in said data structure memory comprises data as to what actions are to be performed on the received packet of data.

30. The system as recited in claim 27, wherein if said information in said second particular entry in said second level of said table does not comprise said second pointer to said third level of said table then said internal processor further comprises circuitry for:

identifying a particular entry in a data structure memory associated with said received packet of data using said information in said second particular entry in said second level of said distributed table.

31. The system as recited in claim 30, wherein said particular entry in said data structure memory comprises data as to what actions are to be performed on the received packet of data.

32. The system as recited in claim 25, wherein if said second particular entry in said second level of said table stores one pattern then said internal processor further comprises circuitry for:

determining if information in said second particular entry in said second level of said table comprises a second pointer to a third level of said distributed table.

33. The system as recited in claim 21, wherein said second level of said table is stored in said internal memory unit.

34. The system as recited in claim 21, wherein one or more of said one or more modules comprises:

an external memory unit, wherein said second level of said table is stored in said external memory unit.

35. The system as recited in claim 21, wherein said switch further comprises:

an external memory unit, wherein said second level of said table is stored in said external memory unit.

36. The system as recited in claim 21, wherein if said information in said first particular entry in said first level of said table does not comprise said first pointer to said second level of said table then said internal processor further comprises circuitry for:

identifying a particular entry in a data structure memory associated with said received packet of data using said information in said first particular entry in said first level of said table.

37. The system as recited in claim 36, wherein said particular entry in said data structure memory comprises data as to what actions are to be performed on the received packet of data.

* * * * *